(12) United States Patent
Hirawaki (10) Patent No.: US 8,932,180 B2
(45) Date of Patent: Jan. 13, 2015

(54) CLUTCH CONTROLLER

(71) Applicant: Fuji Jukogyo Kabushiki Kaisha, Tokyo (JP)

(72) Inventor: Yuki Hirawaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/089,496

(22) Filed: Nov. 25, 2013

(65) Prior Publication Data

US 2014/0144744 A1    May 29, 2014

(30) Foreign Application Priority Data

Nov. 29, 2012  (JP) ................................. 2012-261535

(51) Int. Cl.
*H02P 15/02* (2006.01)
*F16D 11/14* (2006.01)
*F16D 23/02* (2006.01)

(52) U.S. Cl.
CPC ................ *F16D 11/14* (2013.01); *F16D 23/02* (2013.01); *Y02T 10/6239* (2013.01)
USPC ......................................................... 477/12

(58) Field of Classification Search
None
See application file for complete search history.

(56) References Cited

U.S. PATENT DOCUMENTS

| 2,284,353 | A | * | 5/1942 | Allen | 477/11 |
| 2,311,764 | A | * | 2/1943 | Lansing | 477/13 |
| 2,500,956 | A | * | 3/1950 | Mershon | 361/202 |
| 3,915,271 | A | * | 10/1975 | Harper | 477/5 |
| 7,156,771 | B2 | * | 1/2007 | Teraoka | 477/5 |
| 2012/0253577 | A1 | * | 10/2012 | Schaeffer et al. | 701/22 |
| 2012/0259494 | A1 | * | 10/2012 | Schaeffer et al. | 701/22 |

FOREIGN PATENT DOCUMENTS

JP    2006-38136 A    2/2006

* cited by examiner

*Primary Examiner* — Dirk Wright
(74) *Attorney, Agent, or Firm* — McGinn IP Law Group, PLLC (57) ABSTRACT

A claw clutch includes first and second rotors disposed coaxially with each other, and is switched between an engaged state engaging teeth of the rotors and a disengaged state releasing the engagement. An actuator moves either one of the rotors in an axial direction to switch the clutch between the states. A synchronization controlling unit controls an electric motor coupled to the second rotor to cause its rotation number to approach the rotation number of the first rotor when the clutch is switched to the engaged state. An engagement controlling unit that controls the actuator moves either one of the rotors to a position where the teeth are engaged before a difference in rotation speed between the rotors falls within a predetermined range and the rotation number of the second rotor reaches that of the first rotor when the clutch is switched to the engaged state.

8 Claims, 7 Drawing Sheets

Fig. 1

Fig. 3A
Neutral position

Fig. 3B
Chamfered portion contact position

Fig. 3C
Inversely tapered portion contact position

Fig. 3D
Abutment position

CLUTCH CONTROLLER

CROSS-REFERENCE TO RELATED APPLICATIONS

The present application claims priority from Japanese Patent Application No. 2012-261535 filed on Nov. 29, 2012, the entire contents of which are herein incorporated by reference.

BACKGROUND

1. Technical Field

The present invention relates to clutch controllers that switch a claw clutch to an engaged state.

2. Related Art

In a power train of a hybrid vehicle or the like, a claw clutch for switching a gear stage or a running mode is often incorporated (see Japanese Unexamined Patent Application Publication (JP-A) No. 2006-38136). From the viewpoint of suppressing a power loss at the time of disengagement of the clutch, it is preferable to use the claw clutch that dose not include a synchronization mechanism. However, since the claw clutch does not include the synchronization mechanism, it has been necessary to synchronize the rotation speeds of the front and the rear of the claw clutch at high accuracy in order to smoothly switch the claw clutch to an engaged state. To cope with this, in the power train described in JP-A No. 2006-38136, the rotation speeds of the front and the rear of the clutch are synchronized by using an electric motor.

However, even in a case where the rotation speeds are synchronized by using the electric motor, it is extremely difficult to cause the rotation speeds of the front and the rear of the clutch to completely match with each other, and thus a state where one of the rotation speeds exceeds the other of the rotation speeds and a state where the other of the rotation speeds exceeds the one of the rotation speeds are alternately repeated. That is, since the relative rotation direction of the front and the rear of the clutch is constantly changed, a situation in which a spline tooth is flipped and goes in and out repeatedly has occurred when the claw clutch is switched to the engaged state. The repeated going in and out of the spline tooth leads to an increase in time required to switch the claw clutch and an increase in the size of an actuator that controls the claw clutch, and hence it is desired to smoothly switch the claw clutch to the engaged state.

SUMMARY OF THE INVENTION

An object of the present invention is to smoothly switch the claw clutch to the engaged state.

An aspect of the present invention is to provide a clutch controller including: a claw clutch, an actuator; a synchronization controlling unit; and an engagement controlling unit. The claw clutch includes a first rotor having an engagement tooth and a second rotor disposed coaxially with the first rotor and having the engagement tooth, and is switched between an engaged state where the engagement teeth are engaged with each other and a disengaged state where the engagement between the engagement teeth is released. The actuator moves either one of the first rotor and the second rotor in an axial direction to switch the claw clutch between the engaged state and the disengaged state. The synchronization controlling unit controls an electric motor coupled to the second rotor to control a rotation speed of the second rotor such that the rotation speed of the second rotor approaches a rotation speed of the first rotor when the claw clutch is switched to the engaged state. The engagement controlling unit controls the actuator to move the either one of the first rotor and the second rotor toward the other when the claw clutch is switched to the engaged state. The engagement controlling unit moves the either of one of the first rotor and the second rotor to a position where the engagement teeth are engaged with each other in the axial direction before a difference in the rotation speed between the first rotor and the second rotor falls within a predetermined range and the rotation speed of the second rotor reaches the rotation speed of the first rotor.

DETAILED DESCRIPTION

Figure 1:
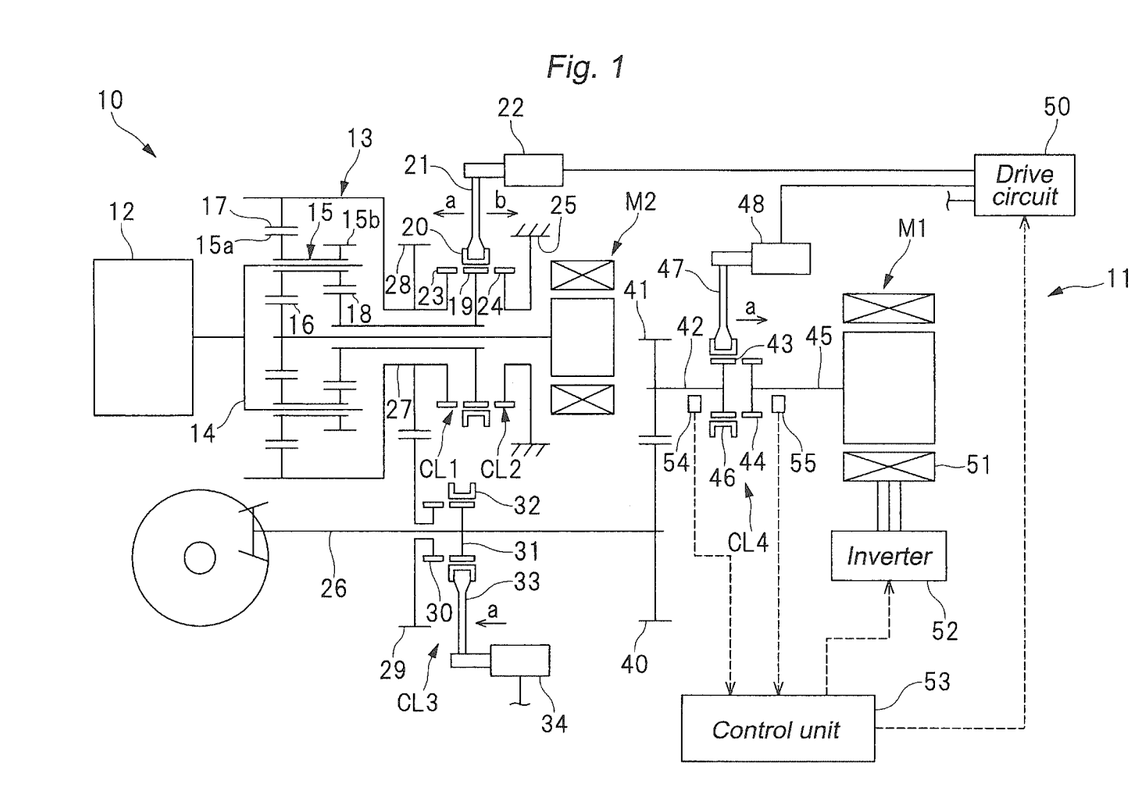
FIG. 1 is a schematic view illustrating a power train mounted on a hybrid vehicle and a part of its control system.

Hereinbelow, an example of the present invention will be described in detail based on the drawings. FIG. 1 is a schematic view illustrating a power train 10 mounted on a hybrid vehicle and a part of its control system. In The power train 10, a clutch controller 11 as an example of the present invention is incorporated. As illustrated in FIG. 1, the power train 10 is provided with an engine 12, a first motor generator M1, and a second motor generator M2 as power sources. In addition, the power train 10 is provided with a clutch CL1, a clutch CL2, a clutch CL3, and a clutch CL4 as claw clutches. Each of the clutches CL1 to CL4 is a dog clutch, i.e., a claw clutch that does not have a rotation synchronization mechanism such as a synchronizer ring or the like.

A power dividing mechanism 13 for dividing engine power for driving wheels and for the motor generator M2 is provided between the engine 12 and the motor generator M2. The power dividing mechanism 13 includes a carrier 14 coupled to the engine 12 and a pinion gear 15 rotatably supported by the carrier 14. The pinion gear 15 has two gear portions 15a and 15b. A sun gear 16 and a ring gear 17 are engaged in the gear portion 15a, and a sun gear 18 is engaged in the gear portion 15b. The motor generator M2 is coupled to the sun gear 16, and a clutch hub 19 is fixed to the sun gear 18.

On the outer peripheral portion of the clutch hub 19, a clutch sleeve 20 is provided so as to be movable in an axial direction. A fork member 21 is attached to the clutch sleeve 20, and an actuator 22 is coupled to the fork member 21. By driving the actuator 22 to move the clutch sleeve 20 in the direction of an arrow a, the clutch sleeve 20 is engaged with a clutch wheel 23. Thus, the clutch hub 19, the clutch sleeve 20, and the clutch wheel 23 constitute the clutch CL1. By engaging the clutch CL1, the sun gear 18 and the ring gear 17 can be engaged, and it becomes possible to stop the differential rotation of the power dividing mechanism 13. That is, by engaging the clutch CL1, it becomes possible to directly couple the engine 12 and the motor generator M2 to each other via the power dividing mechanism 13.

In addition, by driving the actuator 22 to move the clutch sleeve 20 in the direction of an arrow b, the clutch sleeve 20 is engaged with a clutch wheel 24. Thus, the clutch hub 19, the clutch sleeve 20, and the clutch wheel 24 constitute the clutch CL2. By engaging the clutch CL2, it is possible to fix the sun gear 18 to a case 25 and stop the sun gear 18, whereby it becomes possible to increase the rotation fluctuation of the ring gear 17 while reducing the rotation fluctuation of the motor generator M2. That is, by engaging the clutch CL2 functioning as a brake, it is possible to increase the rotation speed of each of the ring gear 17 and a later-described driving wheel output shaft 26 while suppressing the rotation speed of the motor generator M2, and it becomes possible to switch the power dividing mechanism 13 to an overdrive state.

In addition, a driving gear 28 is fixed to a hollow shaft 27 that couples the ring gear 17 and the clutch wheel 23 to each other, and a driven gear 29 engaged with the driving gear 28 is rotatably supported by the driving wheel output shaft 26. A clutch wheel 30 is fixed to the driven gear 29, and a clutch hub 31 adjacent to the clutch wheel 30 is fixed to the driving wheel output shaft 26. On the outer peripheral portion of the clutch hub 31, a clutch sleeve 32 is provided so as to be movable in the axial direction. A fork member 33 is attached to the clutch sleeve 32, and an actuator 34 is coupled to the fork member 33. By driving the actuator 34 to move the clutch sleeve 32 in the direction of an arrow a, the clutch sleeve 32 is engaged with the clutch wheel 30. Thus, the clutch hub 31, the clutch wheel 30, and the clutch sleeve 32 constitute the clutch CL3. By engaging the clutch CL3, it becomes possible to couple the ring gear 17 and the driving wheel output shaft 26 to each other. That is, by engaging the clutch CL3, it becomes possible to connect the engine 12 and the motor generator M2 to the driving wheel output shaft 26. On the other hand, by disengaging the clutch CL3, it becomes possible to disconnect the engine 12 and the motor generator M2 from the driving wheel output shaft 26.

A driven gear 40 is fixed to the other end portion of the driving wheel output shaft 26, and a driving gear 41 engaged with the driven gear 40 is fixed to a transmission shaft 42. A clutch hub 43 is fixed to the transmission shaft 42, and a clutch wheel 44 adjacent to the clutch hub 43 is fixed to a motor output shaft 45 of the motor generator M1. Further, on the outer peripheral portion of the clutch hub 43, a clutch sleeve 46 is provided so as to be movable in the axial direction. A fork member 47 is attached to the clutch sleeve 46, and an actuator 48 is coupled to the fork member 47. By driving the actuator 48 to move the clutch sleeve 46 in the direction of an arrow a, the clutch sleeve 46 is engaged with the clutch wheel 44. Thus, the clutch hub 43, the clutch wheel 44, and the clutch sleeve 46 constitute the clutch CL4. By engaging the clutch CL4, it becomes possible to connect the motor generator M1 to the driving wheel output shaft 26. On the other hand, by disengaging the clutch CL4, it becomes possible to disconnect the motor generator M1 from the driving wheel output shaft 26.

In order to perform a switching control of the clutches CL1 to CL4 of the power train 10, a drive circuit 50 is connected to the actuators 22, 34, and 48, and an auxiliary equipment battery (not shown) is connected to the drive circuit 50 via a power line. An inverter 52 is connected with a stator 51 of the motor generator M1, and a high-voltage battery (not shown) is connected to the inverter 52 via the power line. The clutch controller 11 includes a control unit 53 that outputs control signals to the inverter 52 and the drive circuit 50. To the control unit 53 are connected a rotation sensor 54 for detecting the number of rotations (rotation speed) N1 of the transmission shaft 42, i.e., the clutch sleeve 46, and a rotation sensor 55 for detecting the number of rotations (rotation speed) N2 of the motor output shaft 45, i.e., the clutch wheel 44. When the switching control of the clutch CL4 is performed, based on the numbers of rotations N1 and N2 of the front and the rear of the clutch, the control unit 53 outputs the control signal to the inverter 52 to control the number of rotations of the motor generator M1, and also outputs the control signal to the drive circuit 50 to control the operation state of the actuator. The control unit 53 includes a CPU, a ROM, and a RAM.

Hereinbelow, a description will be given of a control procedure when the clutch CL4 is switched from the disengaged state to the engaged state. In the following description, from among the clutches CL1 to CL4 provided in the power train 10, the clutch CL4 is used as an example, but the other clutches CL1 to CL3 can also be switched from the disengaged state to the engaged state by means of the control procedure described later.

Figure 2:
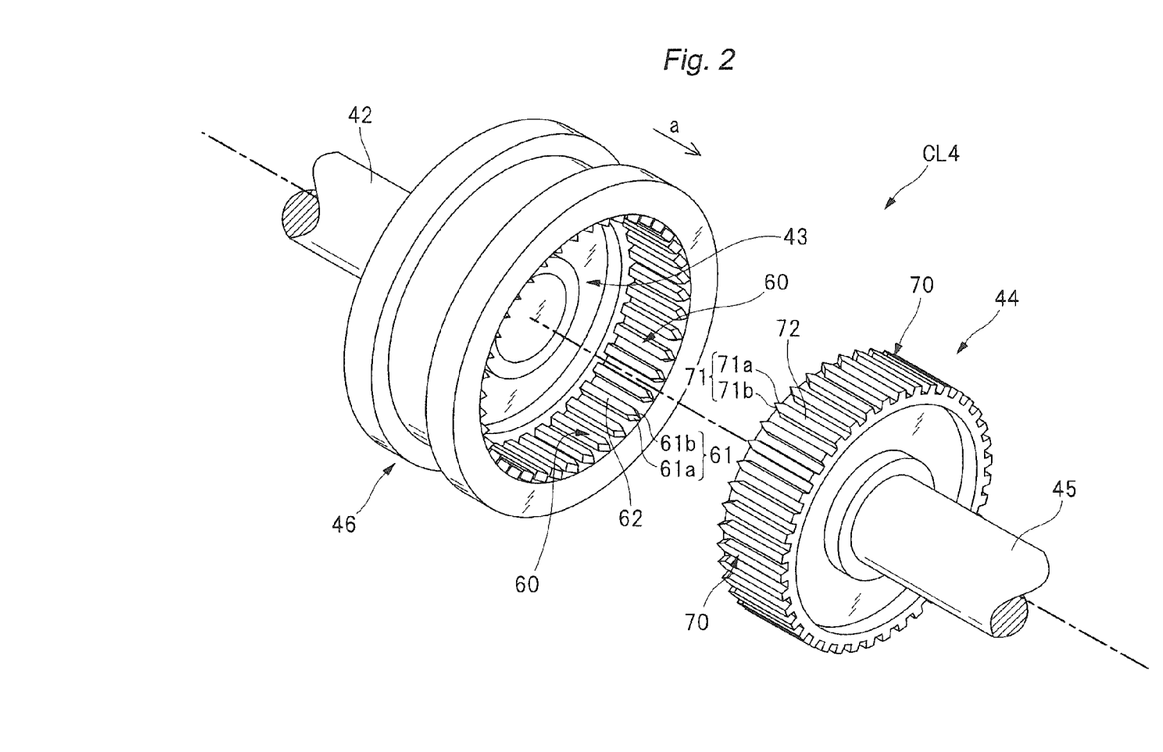
FIG. 2 is an exploded perspective view illustrating the structure of a clutch.

FIG. 2 is an exploded perspective view illustrating the structure of the clutch CL4. As illustrated in FIG. 2, the clutch CL4 includes the clutch sleeve (first rotor) 46 provided on the outer peripheral portion of the clutch hub 43 so as to be movable in the axial direction, and the clutch wheel (second rotor) 44 disposed coaxially with the clutch sleeve 46. On the inner peripheral surface of the clutch sleeve 46, a plurality of spline teeth 60 that protrude inwardly in a radial direction are formed. The spline teeth 60 extend in the axial direction and are disposed at predetermined intervals in a circumferential direction. In addition, each of the spline teeth (engagement teeth) 60 includes a chamfered portion (first chamfered portion) 61 provided at the tip thereof and an inversely tapered portion (first engagement portion) 62 extending from the chamfered portion 61. The chamfered portion 61 includes a chamfered surface 61a provided on one side in a rotation direction and a chamfered surface 61b provided on the other side in the rotation direction. Similarly, on the outer peripheral surface of the clutch wheel 44, a plurality of spline tooth 70 that protrude outwardly in the radial direction are formed. The spline teeth 70 extend in the axial direction and are disposed at predetermined intervals in the circumferential direction. In addition, each of the spline teeth (engagement teeth) 70 includes a chamfered portion (second chamfered portion) 71 provided at the tip thereof and an inversely tapered portion (second engagement portion) 72 extending from the chamfered portion 71. The chamfered portion 71 includes a chamfered surface 71a provided on one side in the rotation direction and a chamfered surface 71b provided on the other side in the rotation direction.

Figure 3A:
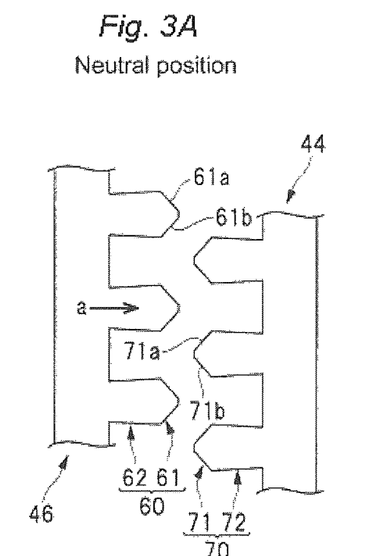
FIGS. 3A to 3D are illustrative views illustrating an engagement process of spline teeth.

Next, a description will be given of an engagement process of the spline tooth 60 of the clutch sleeve 46 and the spline tooth 70 of the clutch wheel 44. FIGS. 3A to 3D are illustrative views illustrating the engagement process of the spline teeth 60 and 70. As illustrated in FIG. 3A, at a position where the stroke of the clutch sleeve 46 (hereinafter referred to as a sleeve stroke) moved by the actuator 48 becomes zero, i.e., at a neutral position of the clutch sleeve 46, the spline tooth 60 of the clutch sleeve 46 is apart from the spline tooth 70 of the clutch wheel 44 in the axial direction. That is, the engagement between the spline teeth 60 and 70 is released. Subsequently, when the sleeve stroke reaches S1 by driving the actuator 48 to move the clutch sleeve 46 in the direction of the arrow a, the clutch sleeve 46 moves to a chamfered portion contact position illustrated in FIG. 3B. Further, when the sleeve stroke reaches S2, the clutch sleeve 46 moves to an inversely tapered portion contact position illustrated in FIG. 3C. Furthermore, when the sleeve stroke reaches S3, the clutch sleeve 46 moves to an abutment position illustrated in FIG. 3D.

Figure 3B:
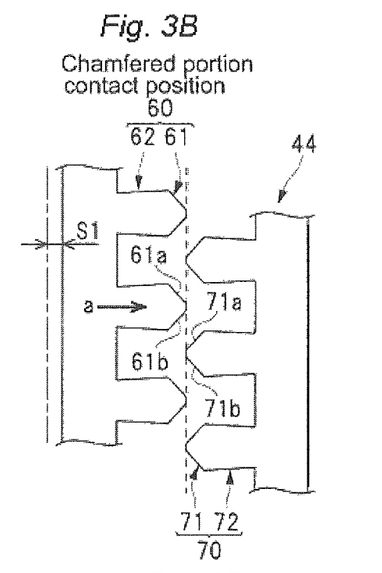
Figure 3C:
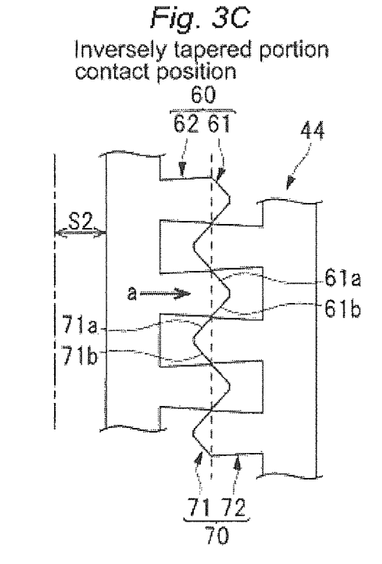
Figure 3D:
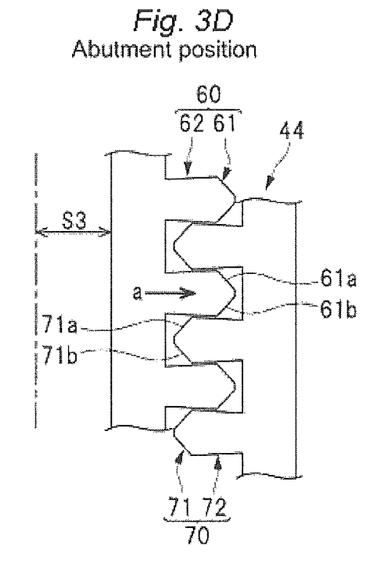

As indicated by a broken line in FIG. 3B, the chamfered portion contact position is a position where the tips of the chamfered portions 61 and 71 overlap each other in the axial direction. By moving the clutch sleeve 46 beyond the chamfered portion contact position, it is possible to bring the chamfered portions 61 and 71 into contact with each other, and it becomes possible to mechanically synchronize the phases of the spline teeth 60 and 70. In addition, as indicated by the broken line in FIG. 3C, the inversely tapered portion contact position is a position where the boundary portion between the chamfered portion 61 and the inversely tapered portion 62 and the boundary portion between the chamfered portion 71 and the inversely tapered portion 72 overlap each other in the axial direction. By moving the clutch sleeve 46 beyond the inversely tapered portion contact position, it is possible to engage the inversely tapered portions 62 and 72 with each other, and the clutch CL4 is thereby switched to the engaged state. Further, the abutment position is a position where the movement of the clutch sleeve 46 is prevented by a stopper (not shown).

Subsequently, a description will be given of an effect on a clutch engagement operation by the contact pattern of the chamfered portions 61 and 71. FIGS. 4A to 4D are illustrative views illustrating the contact patterns of the chamfered portions 61 and 71. In each of FIGS. 4A to 4D, the relative rotation directions of the clutch sleeve 46 and the clutch wheel 44 are indicated by open arrows. Note that, with regard to the open arrows illustrated in FIGS. 4A to 4D, each of the upward open arrows indicates an acceleration direction, while each of the downward arrows indicates a deceleration direction. In addition, each of arrows a indicates the direction of movement of the clutch sleeve 46 when the clutch CL4 is switched to the engaged state.

Figure 4A:
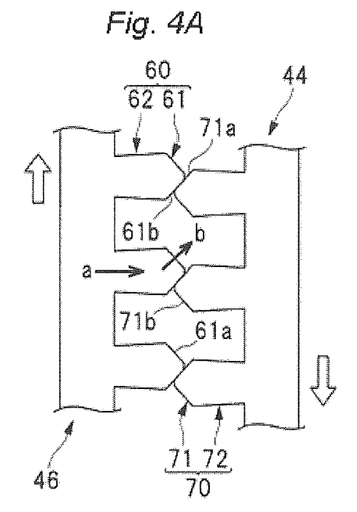
FIGS. 4A to 4D are illustrative views illustrating contact patterns of chamfered portions.
Figure 4B:
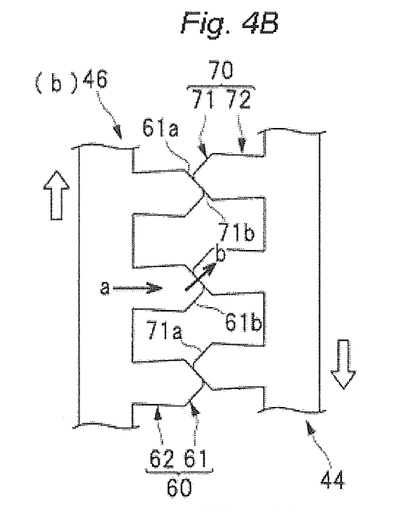

First, a description will be given of a case where the rotation speed of the clutch wheel 44 is lower than that of the clutch sleeve 46, as illustrated in FIGS. 4A and 4B. As illustrated in FIG. 4A, in a case where the chamfered surface 61b of the clutch sleeve 46 and the chamfered surface 71b of the clutch wheel 44 are brought into contact with each other, as indicated by an arrow b, the chamfered surface 61b slides on the chamfered surface 71a so that the clutch sleeve 46 smoothly moves toward the clutch wheel 44. On the other hand, as illustrated in FIG. 4B, in a case where the chamfered surface 61a of the clutch sleeve 46 and the chamfered surface 71b of the clutch wheel 44 are brought into contact with each other, as indicated by an arrow b, the chamfered surface 71b is pushed in by the chamfered surface 61a so that the clutch sleeve 46 moves toward the clutch wheel 44 while being dragged. That is, in the case where the rotation speed of the clutch wheel 44 is lower than that of the clutch sleeve 46, it is preferable to bring the chamfered portions 61 and 71 into contact with each other with the pattern illustrated in FIG. 4A.

Figure 4C:
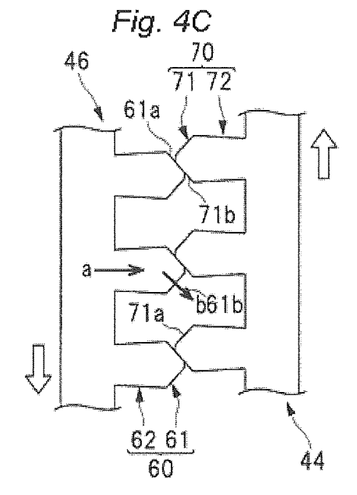
Figure 4D:
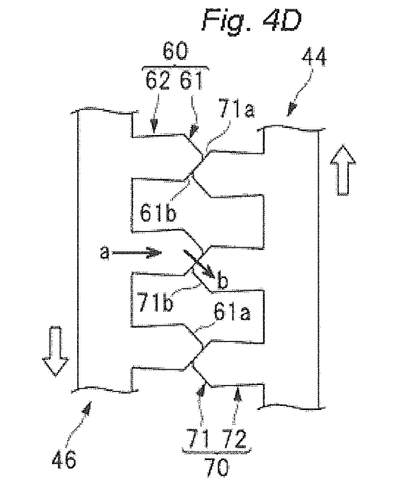

In addition, a description will be given of a case where the rotation speed of the clutch wheel 44 is higher than that of the clutch sleeve 46, as illustrated in FIGS. 4C and 4D. As illustrated in FIG. 4C, in a case where the chamfered surface 61a of the clutch sleeve 46 and the chamfered surface 71b of the clutch wheel 44 are brought into contact with each other, as indicated by an arrow b, the chamfered surface 61a slides on the chamfered surface 71b so that the clutch sleeve 46 smoothly moves toward the clutch wheel 44. On the other hand, as illustrated in FIG. 4D, in a case where the chamfered surface 61b of the clutch sleeve 46 and the chamfered surface 71a of the clutch wheel 44 are brought into contact with each other, as indicated by an arrow b, the chamfered surface 71a is pushed in by the chamfered surface 61b so that the clutch sleeve 46 moves toward the clutch wheel 44 while being dragged. That is, in the case where the rotation speed of the clutch wheel 44 is higher than that of the clutch sleeve 46, it is preferable to bring the chamfered portions 61 and 71 into contact with each other with the pattern illustrated in FIG. 4C.

Figure 5:
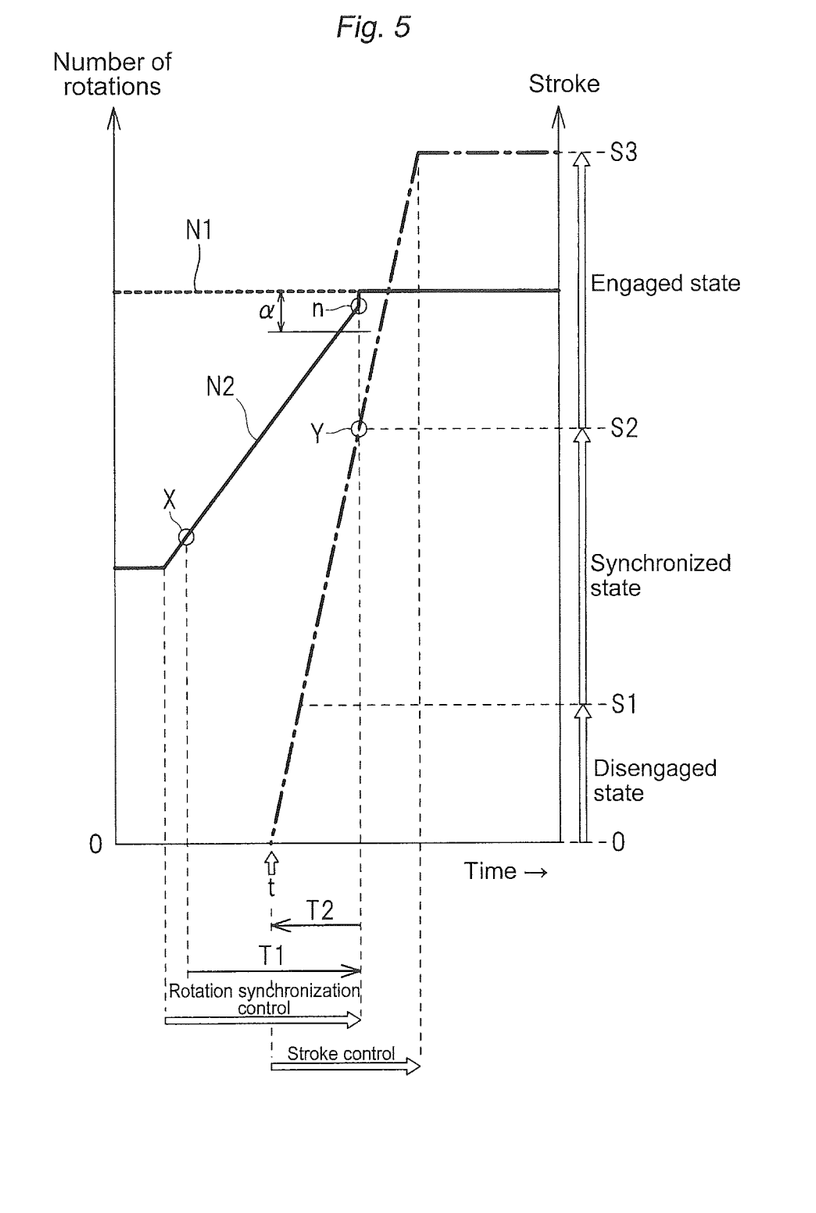
FIG. 5 is a diagram illustrating the number of rotations N1, the number of rotations N2, and a sleeve stroke when the clutch is engaged.

Subsequently, a description will be given of a control procedure when the clutch CL4 is engaged. FIG. 5 is a diagram illustrating the number of rotations N1, the number of rotations N2, and the sleeve stroke when the clutch CL4 is engaged. In FIG. 5, the number of rotations N1 is indicated by a broken line, the number of rotations N2 is indicated by a solid line, and the sleeve stroke is indicated by a one-dot chain line.

As illustrated in FIG. 5, at the time of start of the control when the clutch CL4 is in the disengaged state, the number of rotations N2 is smaller than the number of rotations N1, and hence the control unit 53 starts a rotation synchronization control that increases the number of rotations N2 by using the motor generator (electric motor) M1. The control unit 53 functioning as a synchronization controlling unit sets the number of rotations N1 as the target number of rotations, and controls the motor generator M1 via the inverter 52 such that the number of rotations N2 of the motor generator M1 reaches the number of rotations N1. Subsequently, as indicated by a reference letter X in FIG. 5, the control unit 53 functioning as a synchronization predicting unit calculates an increase speed of the number of rotations N2 (an angular acceleration of the clutch wheel 44), and calculates a synchronization time period T1 of the number of rotations N2 with respect to the number of rotations N1. The synchronization time period T1 denotes a time period required for a difference in rotation speed between the number of rotations N1 and the number of rotations N2 to fall within a predetermined range α. The predetermined range α is a difference in rotation speed permitted when the clutch CL4 is engaged, and is a value pre-set based on the shape of each of the chamfered portions 61 and 71, the strength of the spline tooth, and the rotation speed range. In the case illustrated in FIG. 5, as the synchronization time period T1 required for the difference in rotation speed between the number of rotations N1 and the number of rotations N2 to fall within the predetermined range α, a time period required for the number of rotations N2 to reach the predetermined number of rotations n in the predetermined range α is calculated. When the synchronization time period T1 is calculated in this manner, a predetermined stroke time period T2 is subtracted from the synchronization time period T1, and an operation time t of the actuator 48 is set. The stroke time period T2 is a time period required for the sleeve stroke to reach S2, i.e., a time period required for the clutch sleeve 46 to reach the inversely tapered portion contact position, and is pre-set using a test or simulation. Subsequently, the control unit 53 functioning as an engagement controlling unit outputs the control signal to the drive circuit 50 to cause the drive circuit 50 to start the operation of the actuator 48 at the operation time t.

Thus, by starting the movement of the clutch sleeve 46 at the operation time t, as indicated by a reference letter Y in FIG. 5, it becomes possible to move the clutch sleeve 46 to the inversely tapered portion contact position before the difference in rotation speed between the clutch sleeve 46 and the clutch wheel 44 falls within the predetermined range α, and the number of rotations N2 of the clutch wheel 44 reaches the number of rotations N1 of the clutch sleeve 46. With this, it is possible to move the clutch sleeve 46 to the inversely tapered portion contact position before the number of rotations N2 of the clutch wheel 44 exceeds the number of rotations N1 of the clutch sleeve 46, and hence it becomes possible to smoothly switch the clutch CL4 to the engaged state. That is, by moving the clutch sleeve 46 to the inversely tapered portion contact position before the the clutch wheel 44 that rotates in synchronization exceeds the clutch sleeve 46 in terms of the rotation speed, it is possible to limit the contact pattern of the chamfered portions 61 and 71 to the contact pattern of FIG. 4A or the contact pattern of FIG. 4B. Accordingly, even when the first contact pattern of the chamfered portions 61 and 71 is the contact pattern of FIG. 4B, it is possible to shift the contact pattern thereof to the contact pattern of FIG. 4A at the next timing, and it becomes possible to smoothly switch the clutch CL4 to the engaged state.

In addition, as illustrated in FIG. 5, since the movement of the clutch sleeve 46 is started before the difference in rotation speed between the clutch sleeve 46 and the clutch wheel 44 falls within the predetermined range α, it becomes possible to reduce a switching time period when the clutch CL4 is switched to the engaged state. Further, since it is possible to smoothly switch the clutch CL4 to the engaged state, it is possible to reduce the thrust force of the actuator 48, and it becomes possible to achieve a reduction in the size of the actuator 48. Furthermore, since it is possible to smoothly switch the clutch CL4 to the engaged state, it is possible to omit a rotation synchronization mechanism such as the synchronizer ring or the like from the clutch CL4, and it becomes possible to significantly reduce the power loss in the disengaged state of the clutch CL4.

Figure 6:
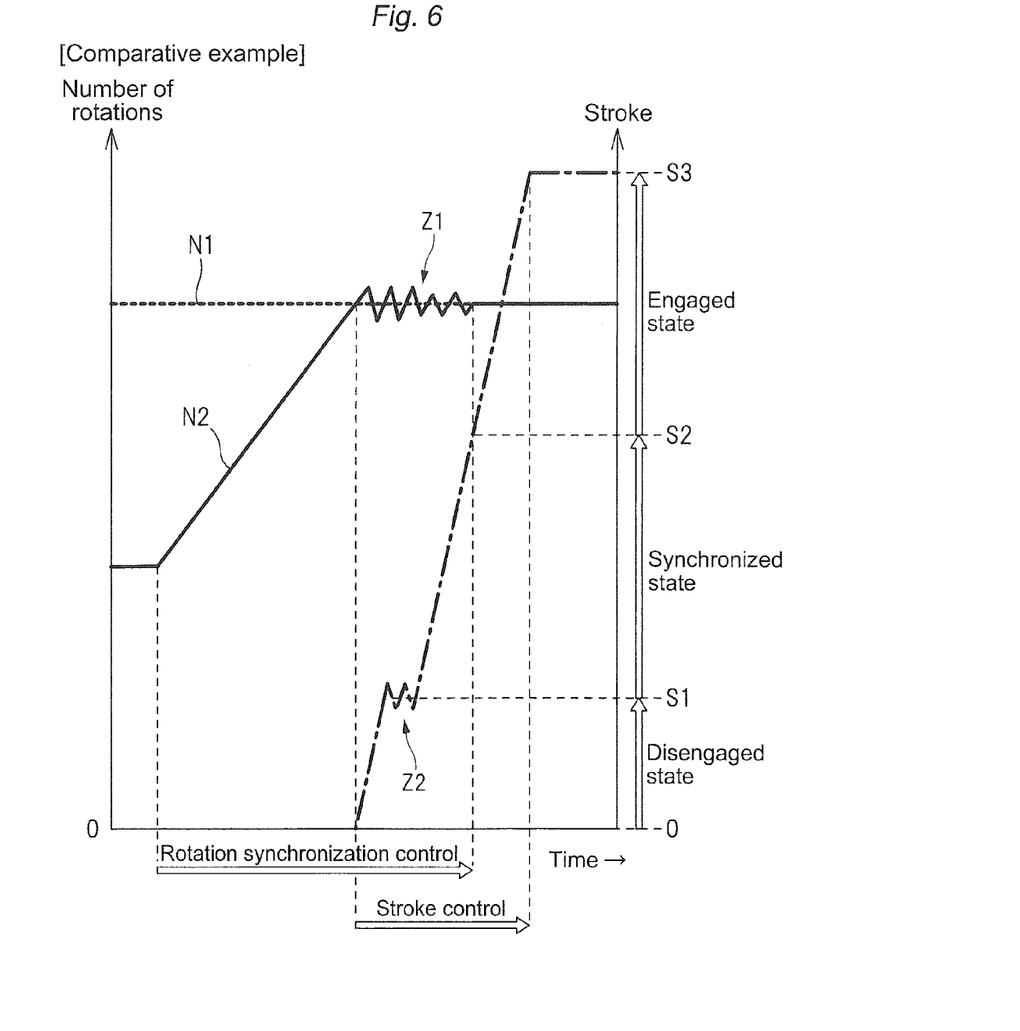
FIG. 6 is a diagram illustrating, as a comparative example, the number of rotations N1, the number of rotations N2, and the sleeve stroke when the clutch is engaged.

FIG. 6 is a diagram illustrating, as a comparative example, the number of rotations N1, the number of rotations N2, and the sleeve stroke when the clutch CL4 is engaged. As illustrated in the comparative example of FIG. 6, in a case where the movement of the clutch sleeve 46 is started after the number of rotations N2 is synchronized with the number of rotations N1, as indicated by a reference letter Z1, the number of rotations N2 falls below or rises above the number of rotations N1 at the timing when the chamfered portions 61 and 71 come in contact with each other. That is, the contact pattern of the chamfered portions 61 and 71 can be any of the contact patterns illustrated in FIGS. 4A to 4D, and hence there is a possibility that the contact pattern of FIG. 4B and the contact pattern of FIG. 4D are alternately repeated. Consequently, as indicated by a reference letter Z2 in FIG. 6, the clutch sleeve 46 goes in and out repeatedly in the vicinity of the chamfered portion contact position (the sleeve stroke S1) while being flipped. In contrast to this, as illustrated in FIG. 5, by moving the clutch sleeve 46 to the inversely tapered portion contact position (the sleeve stroke S2) before the number of rotations N2 of the clutch wheel 44 exceeds the number of rotations N1 of the clutch sleeve 46, it is possible to limit the contact pattern of the chamfered portions 61 and 71 to the contact pattern illustrated in FIG. 4A or FIG. 4B, and it becomes possible to smoothly switch the clutch CL4 to the engaged state.

Figure 7:
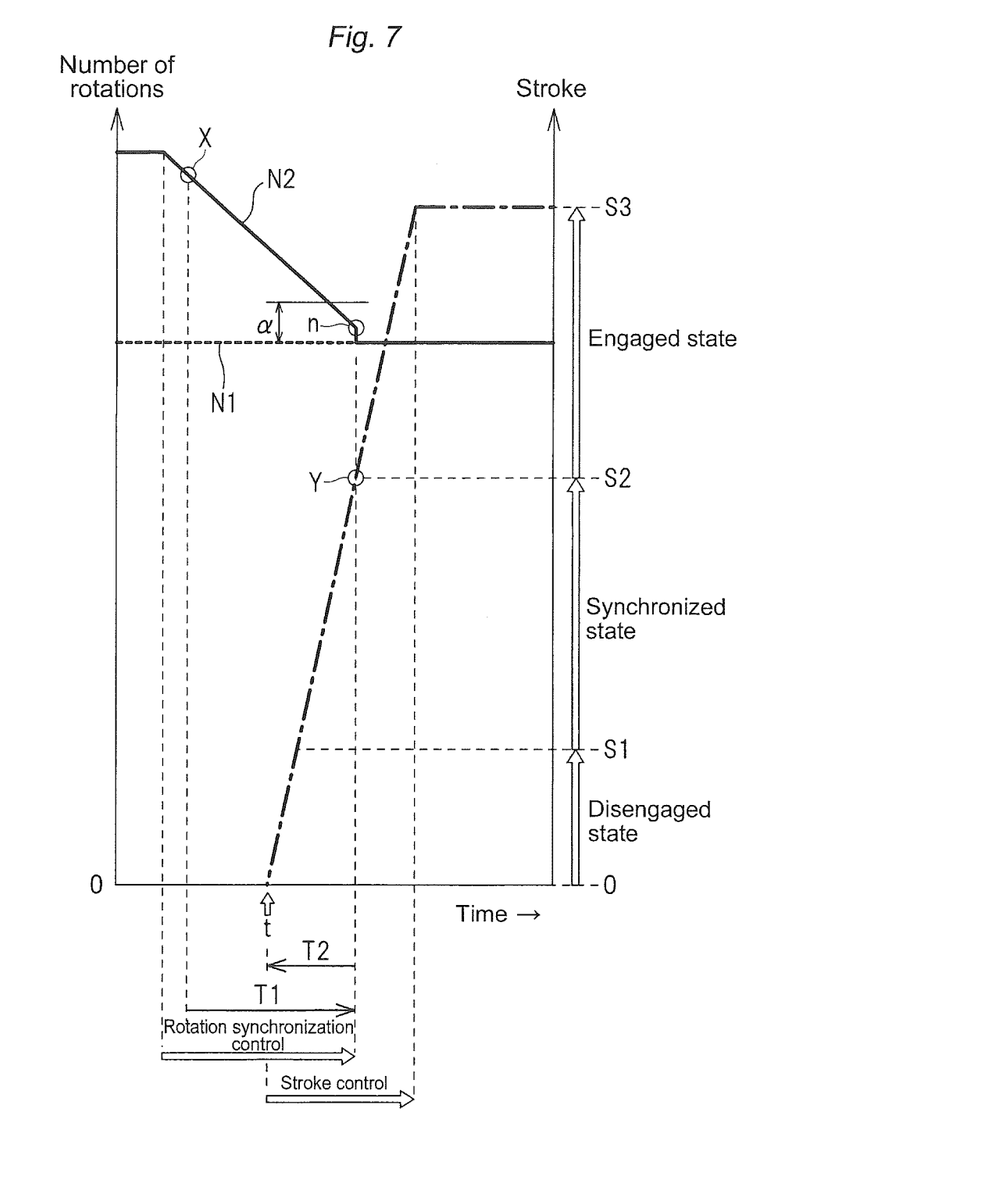
FIG. 7 is a diagram illustrating the number of rotations N1, the number of rotations N2, and the sleeve stroke when the clutch is engaged.

In the above description, although the clutch CL4 is switched to the engaged state after the number of rotations N2 is increased so as to approach the number of rotations N1, the present invention is not limited thereto, and the clutch CL4 may also be switched to the engaged state after the number of rotations N2 is reduced so as to approach the number of rotations N1. FIG. 7 is a diagram illustrating the number of rotations N1, the number of rotations N2, and the sleeve stroke when the clutch CL4 is engaged.

As illustrated in FIG. 7, at the time of start of the control when the clutch CL4 is in the disengaged state, in a case where the number of rotations N2 is larger than the number of rotations N1, the control unit 53 starts the rotation synchronization control that reduces the number of rotations N2 by using the motor generator M1. The control unit 53 sets the number of rotations N1 as the target number of rotations, and controls the motor generator M1 via the inverter 52 such that the number of rotations N2 of the motor generator M1 reaches the number of rotations N1. Subsequently, as indicated by a reference letter X in FIG. 7, the control unit 53 calculates a reduction speed of the number of rotations N2 (the angular acceleration of the clutch wheel 44), and calculates the synchronization time period T1 of the number of rotations N2 with respect to the number of rotations N1. When the synchronization time period T1 is calculated in this manner, the predetermined stroke time period T2 is subtracted from the synchronization time period T1, and the operation time t of the actuator 48 is set. Then, the control unit 53 outputs the control signal to the drive circuit 50 to cause the drive circuit 50 to start the operation of the actuator 48 at the operation time t.

Thus, by starting the movement of the clutch sleeve 46 at the operation time t, as indicated by a reference letter Y in FIG. 7, it becomes possible to move the clutch sleeve 46 to the inversely tapered portion contact position before the difference in rotation speed between the clutch sleeve 46 and the clutch wheel 44 falls within the predetermined range and the number of rotations N2 of the clutch wheel 44 reaches the number of rotations N1 of the clutch sleeve 46. With this, it is possible to move the clutch sleeve 46 to the inversely tapered portion contact position before the number of rotations N2 of the clutch wheel 44 is reduced to be smaller than the number of rotations N1 of the clutch sleeve 46, and hence it becomes possible to smoothly switch the clutch CL4 to the engaged state. That is, by moving the clutch sleeve 46 to the inversely tapered portion contact position before the clutch sleeve 46 exceeds the clutch wheel 44 that rotates in synchronization in terms of the rotation speed, it is possible to limit the contact pattern of the chamfered portions 61 and 71 to the contact pattern of FIG. 4C or FIG. 4D. Consequently, even when the first contact pattern of the chamfered portions 61 and 71 is the contact pattern of FIG. 4D, it is possible to shift the contact pattern thereof to the contact pattern of FIG. 4C at the next timing, and it becomes possible to smoothly switch the clutch CL4 to the engaged state.

In the above description, although the double-side chamfered portions 61 and 71 each having two chamfered surfaces are formed as the chamfered portions 61 and 71 formed in the spline teeth, the present invention is not limited thereto, and a single-side chamfered portion having one chamfered surface may also be formed. In the case where the chamfered portion has only one chamfered surface, it is determined whether or not the clutch CL4 can be smoothly engaged according to the relative rotation direction of the clutch sleeve 46 and the clutch wheel 44, and hence the switching is performed by using the control procedure described in FIG. 5 or FIG. 7.

The present invention is not limited to the above described example, and can be changed in various ways without departing from the gist thereof. In the above description, although the present invention is applied to the clutches CL1 to CL4 incorporated in the power train 10 of the hybrid vehicle, the present invention is not limited thereto, and the present invention may also be applied to the claw clutch incorporated in a drive device of a transmission or the like. In addition, although the spline teeth 60 and 70 illustrated in the drawing include the inversely tapered portions 62 and 72 having the surfaces inclined relative to the rotation direction and the axial direction as the first and second engagement portions, the present invention is not limited thereto. For example, straight portions each having a surface orthogonal to the rotation direction (a surface parallel with the axial direction) may be formed into the spline teeth 60 and 70 as the first and second engagement portions.

In addition, although the electric actuators 22, 34, and 48 are used as the actuators 22, 34, and 48 for switching the clutches CL1 to CL4, the present invention is not limited thereto, and hydraulic actuators may also be used. Further, in the above description, although one control unit 53 is caused to function as the synchronization controlling unit, the engagement controlling unit, and the synchronization predicting unit, the present invention is not limited thereto. For example, the synchronization controlling unit, the engagement controlling unit, and the synchronization predicting unit may be constituted by a plurality of separate control units.

The invention claimed is:

1. A clutch controller comprising:
a claw clutch including a first rotor having an engagement tooth and a second rotor disposed coaxially with the first rotor and having the engagement tooth, the claw clutch being configured to be switched between an engaged state where the engagement teeth are engaged with each other and a disengaged state where the engagement between the engagement teeth is released;
an actuator to move either one of the first rotor and the second rotor in an axial direction to switch the claw clutch between the engaged state and the disengaged state;
a synchronization controlling unit to control an electric motor coupled to the second rotor to control a rotation speed of the second rotor such that the rotation speed of the second rotor approaches a rotation speed of the first rotor when the claw clutch is switched to the engaged state; and
an engagement controlling unit to control the actuator to move the either one of the first rotor and the second rotor toward the other when the claw clutch is switched to the engaged state, wherein
the engagement controlling unit moves the either one of first rotor and the second rotor to a position where the engagement teeth are engaged with each other in the axial direction before a difference in the rotation speed between the first rotor and the second rotor falls within a predetermined range and the rotation speed of the second rotor reaches the rotation speed of the first rotor.

2. The clutch controller according to claim 1, wherein
the engagement tooth of the first rotor includes a first chamfered portion provided at a tip and a first engagement portion extending from the first chamfered portion;
the engagement tooth of the second rotor includes a second chamfered portion provided at a tip and a second engagement portion extending from the second chamfered portion; and
the engagement controlling unit moves the either one of the first rotor and the second rotor to a position where the first engagement portion and the second engagement portion are engaged with each other in the axial direction before the difference in the rotation speed between the first rotor and the second rotor falls within the predetermined range and the rotation speed of the second rotor reaches the rotation speed of the first rotor.

3. The clutch controller according to claim 1, further comprising:
a synchronization predicting unit to predict a synchronization time period required for the difference in the rotation speed between the first rotor and the second rotor to fall within the predetermined range, wherein
the engagement controlling unit starts the movement of the either one of the first rotor and the second rotor based on the synchronization time period before the difference in the rotation speed between the first rotor and the second rotor falls within the predetermined range.

4. The clutch controller according to claim 2, further comprising:
a synchronization predicting unit to predict a synchronization time period required for the difference in the rotation speed between the first rotor and the second rotor to fall within the predetermined range, wherein
the engagement controlling unit starts the movement of the either one of the first rotor and the second rotor based on the synchronization time period before the difference in the rotation speed between the first rotor and the second rotor falls within the predetermined range.

5. The clutch controller according to any one of claim 1, wherein the claw clutch does not include a rotation synchronization mechanism.

6. The clutch controller according to any one of claim 2, wherein the claw clutch does not include a rotation synchronization mechanism.

7. The clutch controller according to any one of claim 3, wherein the claw clutch does not include a rotation synchronization mechanism.

8. The clutch controller according to any one of claim 4, wherein the claw clutch does not include a rotation synchronization mechanism.

* * * * *